(12) United States Patent
Gavit et al.

(10) Patent No.: US 6,909,581 B2
(45) Date of Patent: Jun. 21, 2005

(54) TAPE HEAD ASSEMBLY WITH AIR BEARING GUIDE

(75) Inventors: Stephan E. Gavit, Littleton, CO (US); Christopher D. Goldsmith, Littleton, CO (US)

(73) Assignee: Segway Systems, LLC, Littleton, CO (US)

( * ) Notice: Subject to any disclaimer, the term of this patent is extended or adjusted under 35 U.S.C. 154(b) by 0 days.

(21) Appl. No.: 10/428,312

(22) Filed: May 2, 2003

(65) Prior Publication Data

US 2004/0218308 A1 Nov. 4, 2004

(51) Int. Cl.$^7$ ............................. G11B 5/60; G11B 15/64; G11B 17/32; G11B 21/20
(52) U.S. Cl. ...................................................... 360/231
(58) Field of Search ................................ 360/231, 230, 360/221, 129

(56) References Cited

U.S. PATENT DOCUMENTS

| | | | |
|---|---|---|---|
| 3,281,040 A | 10/1966 | Grant | 242/615.12 |
| 3,840,894 A | 10/1974 | Arseneault | 360/130.24 |
| 3,911,490 A | 10/1975 | Kostin et al. | 360/84 |
| 3,961,369 A | 6/1976 | Baumann et al. | 360/84 |
| 3,979,037 A * | 9/1976 | Burdorf | 242/615.12 |
| 4,710,912 A * | 12/1987 | Greene et al. | 369/218 |
| 5,155,639 A | 10/1992 | Platter et al. | 360/95 |
| 5,310,107 A | 5/1994 | Todd et al. | 242/615.1 |
| 5,570,831 A | 11/1996 | Takeda et al. | 242/615.12 |
| 5,737,153 A * | 4/1998 | Gavit | 360/261.2 |
| 5,777,823 A * | 7/1998 | Gavit | 360/130.21 |
| 6,078,478 A * | 6/2000 | Gavit | 360/291.3 |
| 6,722,608 B1 * | 4/2004 | Gavit et al. | 242/615.12 |
| 6,814,324 B2 * | 11/2004 | Gavit et al. | 242/332.4 |

FOREIGN PATENT DOCUMENTS

| | | |
|---|---|---|
| JP | 61-237252 | 10/1986 |
| WO | WO 03/015087 A1 * | 2/2003 |

OTHER PUBLICATIONS

IBM Technical Disclosure Bulletin, "Air Supported Complaint Tape Guide", vol. 17, #4, Sep. 1974, P. 966, P.J. Arseneault et al.

* cited by examiner

*Primary Examiner*—Julie Anne Watko
(74) *Attorney, Agent, or Firm*—Timothy J. Martin; Michael R. Henson; Rebecca A. Gegick

(57) ABSTRACT

A transducer head assembly used in a read/write recording apparatus employs an air bearing that supports a carriage on an air cushion for reciprocal motion. The carriage supports a transducer and is moved by a drive in order to read or write on a track located on a storage tape. The bearing and the carriage may be mutually keyed to prevent relative rotation. The air bearing is shown to be a porous ceramic material such as alumina. The bearing may be triangular in cross-section, and the carriage may be a triangular frame telescopically received on the bearing. The drive may be a conductive coil that interacts with a magnet on the carriage. A dual air bearing and dual carriages is disclosed to support a pair of transducers. A method of supporting and moving a transducer implements the steps of this structure.

43 Claims, 5 Drawing Sheets

TAPE HEAD ASSEMBLY WITH AIR BEARING GUIDE

FIELD OF THE INVENTION

The present invention generally relates to tape transport apparatus of the type employed in the data storage industry. More particularly, the present invention is directed to a tape head assembly adapted for use in such a tape drive apparatus. The present invention is specifically directed to a tape head assembly wherein the transducer is supported on an air bearing for translation in a transverse direction relative to the transport direction of a tape medium. This invention also concerns a method of supporting the transducer on an air cushion.

BACKGROUND OF THE INVENTION

The present invention continues the development of a read/write recording apparatus for the data storage industry which development includes various components and assemblies described in the earlier issued patents and applications of which i am the named inventor or co-inventor. These include U.S. Pat. No. 5,737,153 issued Apr. 7, 1998 directed to a positioning assembly for recording heads and electronic recording devices. In U.S. Pat. No. 5,777,823, a tape transport apparatus is described that incorporates porous air bearings, and this air bearing technology is extended in U.S. patent application Ser. No. 10/111,728, now U.S. Pat. No. 6,722,608, which claimed the priority of PCT/US99/25421 (published as WO 01/31648). Additional technologies for an overall tape transport system are identified in U.S. Pat. No. 6,078,478 and in PCT/US02/25037 (WO 03/015087).

As discussed in the background of the above-referenced patents and applications, the advent of the information age has experienced substantial growth in both the accumulation and storage of data for online usage as well as for archival purposes. While magnetic disc and optical storage systems have been developed to increase the density of data that can be stored and while other storage devices are contemplated, magnetic tape remains a highly desirable format. This is especially true where the ability to rapidly access the data is of less significance and cost is of concern. Magnetic tape is still desirable since it has a relative low cost and can be easily erased and rewritten.

Magnetic tape is typically stored for use in a cassette form. Here, a spool of tape is contained within a housing. When placed on a read/write recording apparatus, a lead end of the tape is advanced across bearings to a take-up reel, and a read/write transducer is located adjacent to the tape in this path. Tape may then be spooled onto the take-up reel and unspooled back into the cassette so that the tape advances in a transport direction across the transducer.

The density of data that can be stored is dependant upon the number of "tracks" which can independently be placed across the width of the tape. Given a standard tape width, data density can increase by increasing the number of tracks. Thus, absent other factors, for data density to increase, the track width must decrease so that a larger number of tracks can be placed on a tape of given width. Currently, tape cassettes have about a four inch reel of tape that is about one-half inch wide. Approximately 320 tracks are placed across the width of the tape. Thus the track width is about twenty-five microns.

At the time of submitting this application, there are various goals in the tape storage industry to increase the storage capacity of a single four inch diameter magnetic tape cassette at least into the range of several terabytes. To accomplish this, track width must be reduced at least by an order of magnitude. While data density is a concern, it is still necessary to access the data quickly and accurately. Typical tape speeds are approximately twelve meters per second across a transducer. Thus, the difficulty of reading a large number of tracks of very narrow track width accurately as such transport speeds becomes a critical issue in this development project.

As should be appreciated by the ordinarily skilled person in this field, it is necessary that the tape head assembly that carries the transducer be highly responsive and controllable. As a tape is transported, deviations in track positioning can result from various conditions. Predominate among these is lateral drift of the tape from a datum reference which can result from tape guide problems, tape flutter, staggerwind on the take-up reel, to name a few. Regardless of the source of the deviation, it is necessary that the transducer maintain an accurate position relative to the tracks at all times. This requires the use of a tape head that can dynamically adjust to tracking deviations with extremely rapid response.

The response time of the tape head is naturally dependent upon the forces which resist the response. Two major forces which can contribute to the response time are the inertia mass of the moving portion of the tape head assembly and frictions inherent in the system that resist such movement. This problem is compounded since the tape head assembly must reciprocate to follow a tape track as the track deviates in either of the two lateral directions. Thus, it is necessary that the movement of the tape head assembly in one direction must be able to be quickly arrested and reversed into the opposite direction at a very high cycle rate.

Current tape head assemblies used in commercial applications employ a carriage that supports a transducer with the carriage mounted on and supported by a guide for translational motion. Typically, these guides are elongated cylinders made, for example, of a ceramic material. Mechanical roller bearings are typically formed as one or more skates which travel along the guide. Such tape head assemblies are marketed, for example, by the Hewlett-Packard Company and by Storage Technology Corporation.

The tape head assemblies noted above can typically weigh between eight and fifteen grams and contain numerous parts. This weight and the various moments of inertia and frictions associated with the mechanical bearings place a limit on the response time of these tape drive heads such that the ability to employ existing tape drive assemblies for use with tape cartridges in terabyte range is questionable. Moreover, these tape head assemblies are expensive to produce and may be subject to costly repairs should a breakdown in the tape head assembly occur.

Accordingly, there is an increasing need in this industry for improved tape head assemblies which may be employed with read/write equipment. There is a need to reduce the complexity of the parts and manufacture of tape head assemblies. There is still a further need for such tape head assemblies that have a minimum mass and which can exhibit extremely fast response times. The present invention is directed to meeting these needs.

SUMMARY OF THE INVENTION

It is an object of the present invention to provide a new and useful tape head assembly that implements a new and useful method of supporting a transducer that may be used in read/write recording operations.

It is a further object of the present invention to provide a tape head assembly that is adapted for use in a tape drive apparatus and a tape drive apparatus incorporating such a tape head assembly.

Yet another object of the present invention is to provide a tape head assembly that may be support a transducer wherein the tape head assembly has a rapid response time so that it may accurately follow a tape track of extremely small bits and rapidly adjust to the deviations in that tracking path.

Still a further object of the present invention is to provide a new and useful method of and assembly for supporting a transducer relative to a tape medium so that the transducer may act reliably, accurately and quickly follow a data track on a tape medium subjected to a read/write function of the transducer.

Yet a further object of the present invention is to provide a method and assembly that can accurately follow a tape track that is substantially narrower than existing technologies.

According to the present invention then a transducer head assembly is adapted for use in a read/write application. Broadly, the transducer head assembly includes an air bearing member that is adapted to be placed in fluid communication with a source of pressurized air when in an active state. The air bearing member has a bearing surface area from which air is emitted when in the active state. A carriage is then supported on the air bearing member such that, when the air bearing member is in the active state, an air cushion is created between the bearing surface and the carriage. In this manner, the carriage floats for reciprocal movement along the translational axis relative to the air bearing member. A transducer is disposed on the carriage member, and a drive is operative to reciprocate the carriage. In the exemplary embodiment, the drive that reciprocates the carriage is provided by a magnet and electromagnetic coil.

In the exemplary embodiment, at least a portion of the air bearing member that provides the bearing surface is constructed of a porous material. However, it is desirable that the entire air bearing member be constructed of a porous material. This porous material may be selected from a group consisting of ceramics, metals and composite materials. The porous material may be a ceramic material impregnated with a selective adhesive. In the exemplary embodiments, the porous material is selected to be alumina. This porous material may be two percent to fifty percent open.

The air bearing member has at least one air distribution cavity formed therein. This can be a single large plenum that forms a hollow interior for the air bearing member. Thus, the air bearing member is formed as a shell having a sidewall surrounding a longitudinal extending plenum. This plenum can have a sidewall thickness of about 0.040 to 0.100 inches. Alternatively, the air bearing member can have a plurality of air distribution cavities formed as a plurality of generally parallel, elongated bores. Where a plurality of air diffusion cavities are provided, a manifold is used and is in fluid communication with the source of pressurized air and with the bores. In this manner, the manifold distributes pressurized air to the bores so that it may be ejected from the bearing surface area. The manifold may be formed in the air bearing member, itself, such as by a channel, or maybe formed in a base or a spacer or other support for the air bearing member.

The air bearing member can have any desired geometry, for example, the air bearing member may be formed generally in the shape of prism having a cross-section in the shape of a polygon with n sides wherein n is an integer greater than 2. In any event, the carriage and the air bearing member should be keyed with respect to one another thereby to prevent relative rotation above the translational axis. Where the air bearing member is formed as a polygon, the carriage can include a frame extending a majority of the distance around the air bearing. In the exemplary embodiments, the frame extends completely around the air bearing.

The carriage includes a glide portion facing the bearing surface such that, when in the active state, the glide portion is supported by the air cushion. This glide portion can readily be a glide plate that is secured to the frame to form the glide portion. In the exemplary embodiments, the air bearing member is an isosceles right triangle and the carriage is an isosceles triangular frame that extends around the air bearing member. Here, three glide plates are employed.

According to the present invention, also, a multiple transducer tape head assembly can be constructed. Here, at least two air bearing members are adapted to be placed in fluid communication with the source of pressurized air when in an active state. Each has a bearing surface area from which air is emitted in the active state. Each bearing member has a carriage supporter for reciprocal movement so that when the air bearing member is in the active state the air cushion is created between the bearing surface and the respective carriage so that each carriage floats for reciprocal movement. A transducer is then disposed on each of the carriage members. These transducers can be oriented in closely spaced, parallel relation and translate along parallel translational axis.

The present invention also is directed to an improvement to a tape read/write apparatus and to a method of supporting a transducer in a read/write apparatus. The improvement, of course, is the inclusion of a transducer head assembly of the type discussed above. The method includes any of the processing steps that are inherent in this structure.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

The present invention broadly concerns the transfer of information between a transducer and a storage medium wherein the transducer is operative to either implant data on the medium, read data residing on the medium or to perform a combination of these features. Thus, as used in this application, the term "read/write" should be understood to cover read operations, write operations or a combination of read/write operations. Moreover, while the present invention is described with respect to the transfer of information between a read/write transducer and a magnetic tape medium, it should be understood that this invention is not limited to just this application. Indeed, the present invention may provide a head assembly that can carry a transducer of any type presently known or hereinafter developed and can include by way of example, but not limitation, magnetic read/write operations, optical read/write applications and the like.

Still further, while the present invention is directed to read/write operations with respect to a tape medium, whether it be magnetic or optical, it should be understood that the structure of the head assembly of the present invention might also be extended to disc storage devices or other devices where it is desired to support a transducer relative to a medium and extremely accurately control the positioning of the transducer relative to a recorded track on the medium. Therefore, the present invention is not to be read as being limited in any way to simply magnetic tape applications; however, this invention will be described with respect to such application for ease of understanding.

Figure 1:
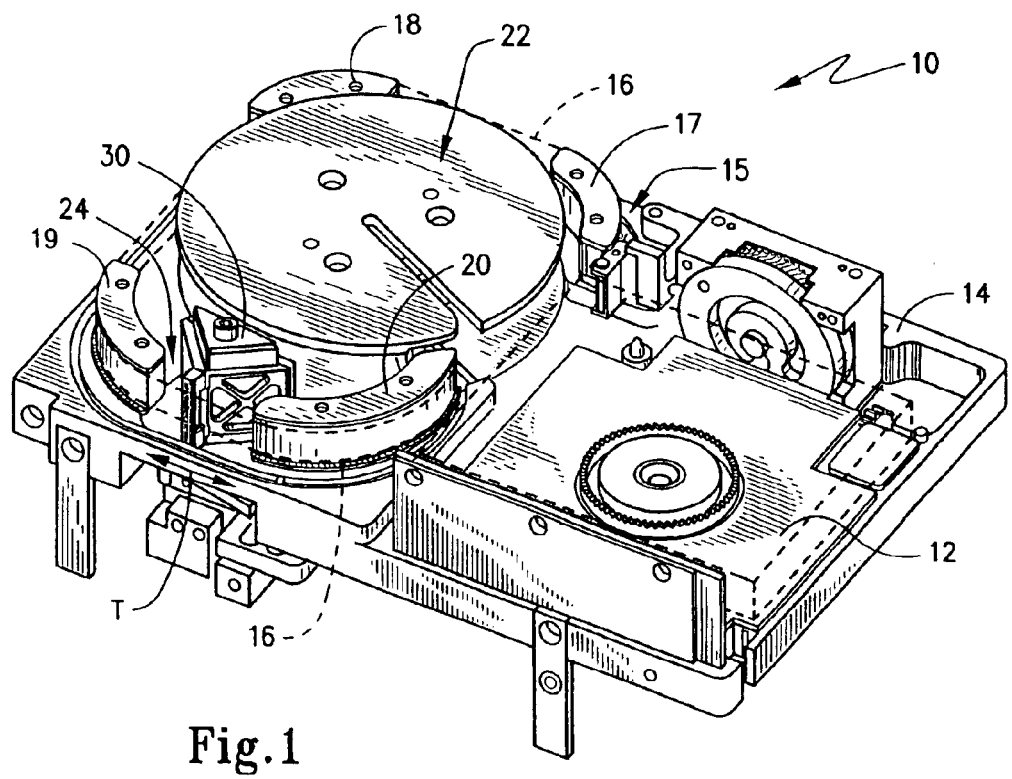
FIG. 1 is a perspective view of a tape transport apparatus incorporating a tape head assembly according to a first exemplary embodiment of the present invention.

Turning, then, to FIG. 1, a tape transport apparatus 10 is illustrated and is adapted to receive a cassette or cartridge 12 (shown in phantom) that contains a supply of a tape medium. Cartridge 12 rests in a docking station, and tape 16 (shown in phantom) is withdrawn from cassette 12 and is threaded around a plurality of bearings such as bearings 17, 18, 19 and 20. Tape 16 is then collected in a take up assembly illustrated as reel 22.

While this structure is generally known in the art, the tape drive apparatus 10 illustrated in FIG. 1 is subject various ones of existing patents and co-pending applications. By way of background, these include U.S. Pat. No. 5,777,823 and U.S. patent application Ser. No. 10/111,728. now U.S. Pat. No. 6,722,608, which claimed the priority of PCT/US 99/25421 (published as WO 01/31648) which are specifically incorporated herein by reference. This patent and the application describe a tape transport apparatus that incorporates these porous air bearings. Additional technologies for an overall system are identified in PCT/US 02/25037 (WO 03/015087), the disclosure of which is incorporated herein by reference.

In any event, returning to FIG. 1, it may be seen that tape 16 may be transported forward and backward in a transport direction "T". A transducer head assembly 30 according to a first exemplary embodiment of this invention is disposed in a transport region 24 that is located between bearings 19 and 20 so that the transducer, discussed below, is proximate to tape 16 during the transport operation. Air bearings 17 and 18 are provided so that tape 16 can be threaded from cassette 12 around air bearings 17–20 to take-up assembly 22, as is known in the art and is driven by a suitable motor drive, as is also known. Take up assembly 22 can also be of the type described in copending U.S. patent application Ser. No. 10/189,813, the disclosure of which is hereby incorporated by reference. A tape threading assembly 15 of any type known in the art can perform the threading operation, and a representative tape threading assembly according to my design is shown in U.S. patent application Ser. No. 10,189, 881, now U.S. Pat. No. 6,814,324, the disclosure of which is hereby incorporated by reference.

The present invention, however, is directed to a transducer head assembly that may generally be used with any type of tape read/write apparatus in addition to that apparatus shown in FIG. 1, so that the exact structure of the tape read/write apparatus, such as those set forth above, is not essential for an understanding of this invention. Transducer head assembly 30 is introduced in FIGS. 2 and 3. Here, it may be seen that transducer head assembly 30 includes an air bearing 32 that is rigidly supported on a base 34. Here, it should be understood that base 34 can be an independent base or can actually be a portion of support framework 14 without departing from the scope of this invention. Accordingly, it should be understood that reference to base 34 could be interpreted as reference to a region of support framework 14 proximate to transport region 24. Further, it should be understood that the term "air" is generally understood to be referring to atmospheric air but, for purposes of this application, it could be any gaseous material that may be injected into air bearing 32 to create the air cushion, as described more thoroughly below.

In any event, transducer head assembly 30 also includes a carriage 36 that is disposed on air bearing 32 for reciprocal movement in a translational direction "X" which, with reference to FIG. 1, may be seen to be transverse to the transport direction "T" of tape 16. Carriage 36 includes a frame 38, and it may be seen that transducer 40 is supported on frame 38 for reciprocal translation in the direction of arrow "X".

Figures 2, 3:
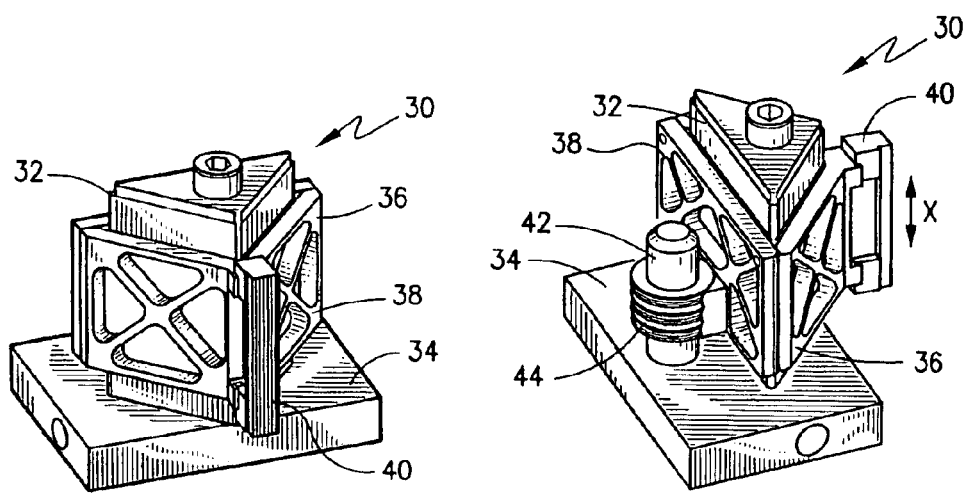
FIG. 2 is a front view in perspective showing the tape head assembly according to the first exemplary embodiment of the present invention.
FIG. 3 is a perspective view showing the rear of the tape head assembly in FIG. 1.

An electromagnetic drive is provided for carriage 36 with the fundamentals of this electromagnetic drive being well known in the art. As illustrated in FIG. 3, base 34 supports a cylindrically shaped, upright permanent magnet 42 thereon. Carriage 36 mountably supports an electromagnetic coil 44 which is telescopically received on cylindrical magnet 42. As is known, changes in the electrical current flowing through coil 44 will interact with the magnetic field of magnet 42 so as to translate carriage 36 and transducer 40 during a read/write operation.

Figure 4:
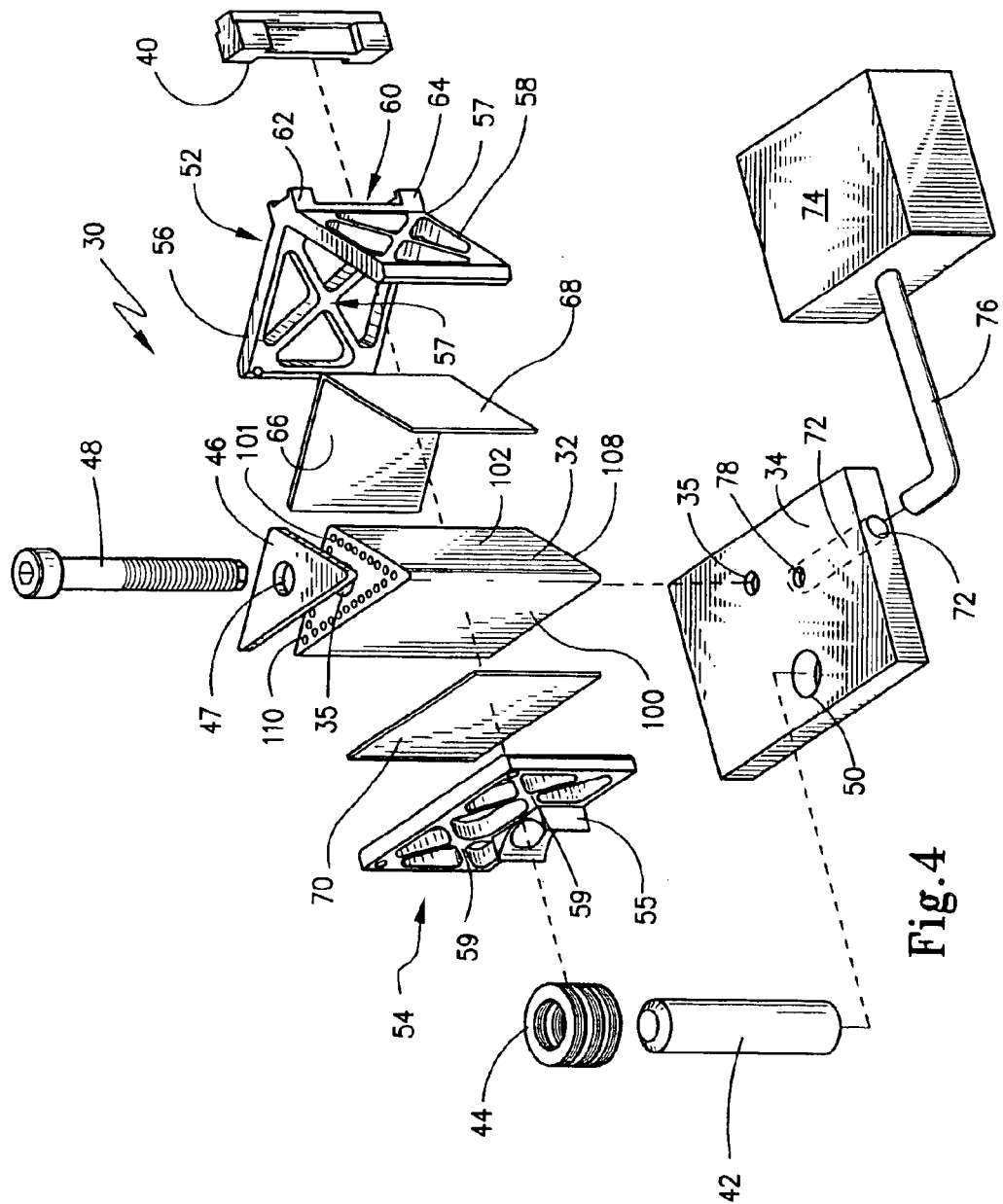
FIG. 4 is an exploded view of the tape head assembly of FIGS. 2 and 3.

The structure and construction of transducer head assembly 30 is shown in increased detail in FIG. 4. Here, it may be seen that air bearing 32 is mounted to base 34 by means of a top cover plate 46 and a mounting screw 48. Mounting screw 48 extends through a central opening 47 formed in cover plate 46 and through a central bore 33 that extends through air bearing 32. Screw 48 is then mounted in threaded opening 35 formed in base 34. Magnet 42 is received in opening 50 and is secured relative to base 34 in any convenient manner known in the art.

Carriage 36 may be seen in FIG. 4 to be constructed of a first carriage piece 52 and a second piece 54. First carriage piece 52 includes a pair of wings 56 and 58 that are formed at right angles to one another and are machined with high precision at a 90 degree angle. Carriage piece 52 is also shown to include a cradle 60 formed by supports 62 and 64 for transducer 40. Second carriage piece 54 includes a bracket 55 that supports coil 44. Carriage 36 also includes a plurality of glide plates secured thereto. For example, a glide plate 66 is secured to wing 56, and glide plate 68 is secured to wing 58 and a glide plate 70 is secured to carriage piece 54. Carriage pieces 52 and 54 may be constructed of any suitable lightweight material, such as magnesium, thermosetting plastics, fiber filled plastics, composites and the like.

As discussed more thoroughly below, air bearing 32 is preferably formed of a porous ceramic material, however, any suitable air bearing may be employed with the transducer head assembly according to this invention. Thus, for example, it may be possible to use existing metal air bearings having air bearing surfaces drilled with a plurality of outlet ports to create an air bearing surface. In any event, it is necessary to supply air bearing 32 with a source of pressurized air (or other gas). To this end, base 34 includes an inlet passageway 72 that is connectable to a source of pressurized air 74 by means of a suitable conduit 76. Passageway 72 has an outlet port 78 so that air from source 74 may be ejected out of outlet 78 for introduction into air bearing 32.

Figure 5:
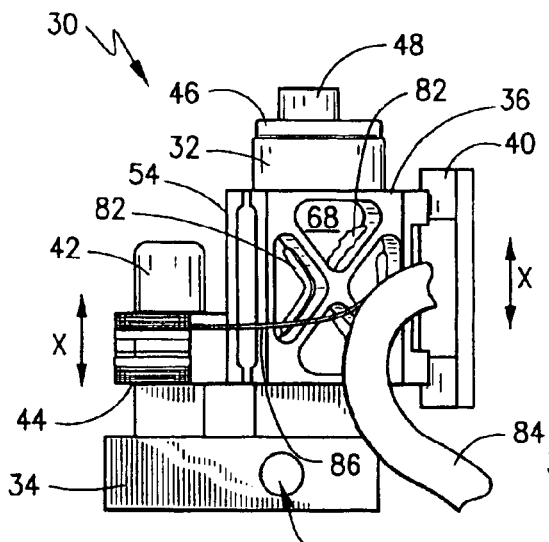
FIG. 5 is a side view in elevation showing the tape head assembly of FIGS. 2 and 3 showing electrical interconnection therewith.
Figure 6:
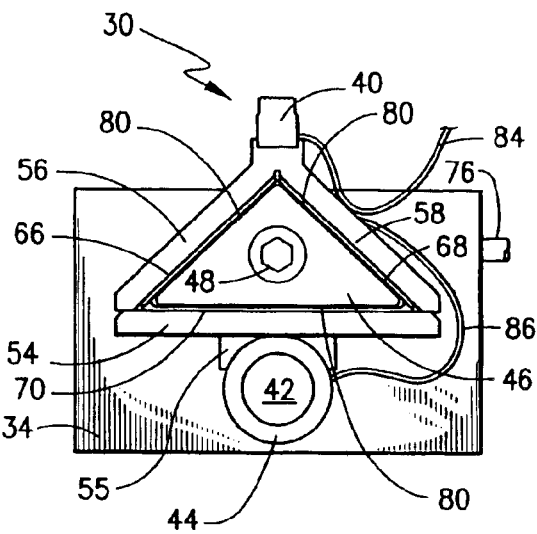
FIG. 6 is a top plan view of the tape head assembly of FIG. 5.

Transducer head assembly 30 is shown assembled in FIGS. 5 and 6 where it may be seen that carriage 36 is telescopically received on air bearing member 32 for reciprocal motion in the direction of arrow "X". The surfaces of air bearing member 32 provide a bearing surface from which air is emitted when pressurized air is supplied through inlet passageway 32. Glide plates 66, 68, and 70 accordingly ride on an air cushion 80 that is formed by air escaping from the surfaces of air bearing member 32 and the respective guide plates. Each of the guide plates 66, 68, and 70 are affixed to carriage 36 by means of suitable adhesive 82. It should be appreciated by a skilled person in this field that other structures would be acceptable for carriage 36 so long as the carriage floats relative to air bearing member 32 for reciprocal movement along a translational axis.

As is further illustrated in FIGS. 5 and 6, an electrical harness 84 is provided to carry the necessary electrical leads for transducer 40 as well as power leads 86 for coil 44. In this manner, transducer 40 may be instructed to place information on a recording medium or retrieve information from the recording medium. If carriage 36 is constructed of a lightweight insulating material such as Bakelite, the electrical leads may be mounted directly on the carriage without the need for a harness. This potentially can reduce the weight and therefore increase the performance of the transducer head assembly.

Power leads 86 provide electrical current coil 44 to act as a drive that is operative to reciprocate carriage 36 that is that the changes in current will cause carriage 36 to move upwardly or downwardly as a result of the electromagnetic interaction with magnet 42. This sort of a drive is known in the art and may not be further explained. However, it should be appreciated at this juncture that other drives known in the art or hereafter developed may be incorporated into transducer head assembly 30 without departing from the scope of this invention. For example, and not by way of limitation, linear mechanical motors such as linear motors may be employed, if desired.

Figure 7:
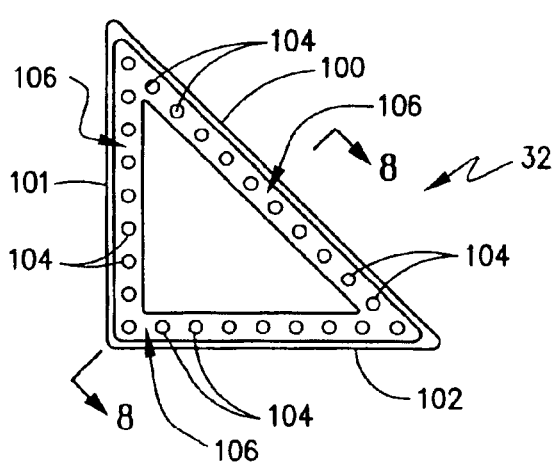
FIG. 7 is a bottom plan view of the air bearing guide used in the tape head assembly of FIGS. 2–6.
Figure 8:
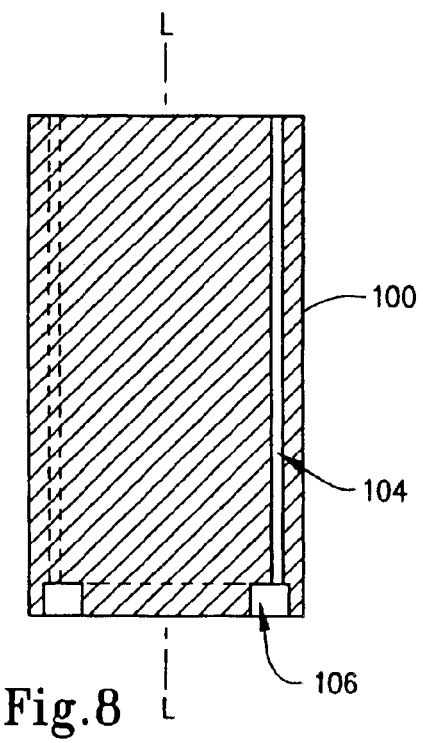
FIG. 8 is cross-sectional view taken about lines 8—8 of FIG. 7.

With reference to FIGS. 7 and 8, the structure of air bearing member 32 can be seen in greater detail. Here, it may be seen that air bearing member 32 is constructed so that at least a portion of the air bearing member provides a bearing surface constructed of porous material. The porous material may be selected from a group consisting of ceramics, metals and composite materials although in the embodiment shown in this application, the porous material is a ceramic material, such as alumina. This ceramic material may be impregnated with the selected adhesive, if desired, and this porous material has a porosity such that it is between 2 and 50 percent open. In FIGS. 7 and 8, air bearing member 32 is constructed entirely out of a porous ceramic material.

Moreover, as is shown in FIGS. 7 and 8, it may be seen that air bearing member 32 is formed as a triangular prism. By forming air bearing member 32 as a triangular prism and by providing carriage 36 with a geometrically similar triangular cavity, air bearing member 32 and carriage 36 are keyed to one another to prevent relative rotation about the translational axis. Since it is desired that rotation be prevented, air bearing member 32 could be generally in the shape of a prism having a cross-section in the shape of a polygon having n sides where n is an integer greater than 2. Any other non-circular shape would be acceptable although perhaps not as easy to construct as that described herein. Even a circular cross-section would be acceptable if proper keying were undertaken.

In the exemplary embodiment, air bearing 32 has a cross-section that is triangular and, indeed, is an isosceles right triangle (45/45/90 degree). In this manner, bearing member 32 has two sides 101 and 102 that are right angles to each other and a hypotenuse 100. Each of sides 101 and 102 form a 45 degree angle with hypotenuse 100. This shape may be very efficiently machined to exceedingly high precision. With this construction, the bearing surface area of air bearing member 32 extends completely around its perimeter with hypotenuse surface 100, side surface 101 and side surface 102 forming the bearing surfaces for the air bearing member 32.

Air bearing member 32 is substantially a solid piece of ceramic material. In order to provide air to the air bearing surfaces, however, at least one air distribution cavity is formed therein. While it would be possible to form the air distribution as a single large plenum centrally disposed and longitudinally extending through air bearing member 32, in the embodiment shown in FIGS. 7 and 8, a plurality of air distribution cavities are provided with these air distribution cavities each being formed generally as an elongated bore 104. Bores 104 are generally parallel with respect to one another and extend parallel to the longitudinal axis "L" of air bearing member 32. Each of bores 104 are dispersed in closely space relation and parallel to its respective hypotenuse surface 100, side surface 101 and side surface 102.

In order to provide uniform air pressure to each of the bores 104, a manifold in the form of a channel 106 extends around a base end 108 air bearing member 32 such that, when mounted on base 34, channel 106 communicates with outlet port 78 so that air from source 74 supplied by conduit 76 and inlet passageway 72 is introduced into channel 106 that is in fluid communication with each of bores 104. Cover plate 46 is provided to feel the opposite ends of each bore 104 at opposite end 110 of air bearing member 32 that is opposite base end 108. This is accomplished when cover plate 46 and air bearing member 32 are mounted on base 34 by means of mounting screw 48.

Naturally, it should be appreciated that the exact structure of air bearing member 32 could be modified without departing from the essence of this invention. For example, bores 104 could be formed so as not to extend entirely through the air bearing member eliminating the necessity of cover plate 46. Here, end 110 might be sealed by a sealing coating, such as a paint seal or otherwise. Moreover, portions of surfaces 100, 101 and 102 could be sealed, if desired.

Figure 10:
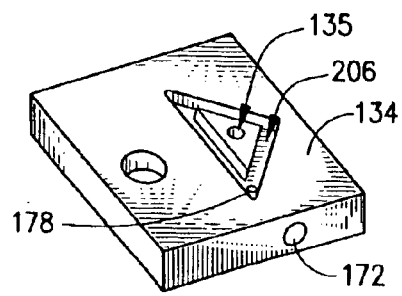
FIG. 10 is a perspective view of an alternative manifold structure that may be used with the air bearing of the present invention.

A different manifold structure could be provided instead of channel 106. For example, as is shown in FIG. 10, a base member 134, which could again be part of the support framework of the tape transport apparatus could be provided with a channel 206. Here, inlet passage 172 communicates with an outlet port 178 that is located within channel 206. An air bearing member such as air bearing member 32 omitting channel 106 but including bores 104 could then be mounted over channel 206 on base 134 by means of threaded opening 135 so that channel 206 is in fluid communication with each of the bores 104. Channel 206 then provides a manifold for such air bearing without the manifold being formed in base end 108.

Another alternative manifold could be provided by using a spacer structure that provides a manifold with the spacer being interposed between the framework and the air bearing member. Thus, when reference is made herein and in the claims to a "manifold" is should be understood that any of these structures or other structures apparent to the ordinarily skilled person in this field should be included within the definition of the manifold. Likewise, the term "air distribution cavity" should be interpreted to mean any passageway for conducting air (or other gas) so as to create the air bearing for the carriage.

Figure 9:
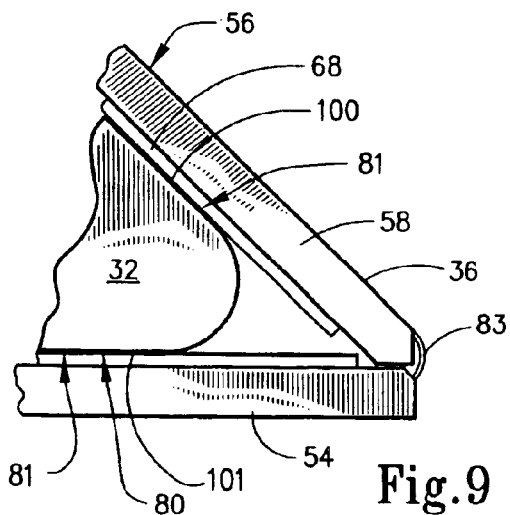
FIG. 9 is an enlarged view, broken away, showing the interfacing of the carriage and air bearing of the tape drive assembly of FIGS. 2–6 at a corner of the air bearing.

Turning now to FIGS. 4, 5 and 9, it should be understood that carriage 36 and air bearing member 32 are constructed with very high precision. To mate a carriage 36 with an air bearing member 32, air bearing member 32 is machined with high precision in a triangular shape described above. Air bearing member 32 is mounted on base 34 by means of cover plate 46 and mounting screw 48 and a reverse pressure is applied to inlet passageway 72. Air is then being drawn from the environment internally into air bearing member 32. At this point, guide plates 66 and 68 are suction adhered to side surfaces 101 and 102, and a thin high precision shim is interposed between guide plate 70 and hypotenuses surface 100 so that guide plate 70 is also held stationary relative to surface 100 with such shim in position.

While vacuum is applied, carriage piece 52 is placed over guide plates 66 and 68 so that guide plate 66 confronts the inner surface of wing 56 and guide plate 68 confronts the interior surface of wing 58. Guide plate 66 and 68 are adhered, respectively, to carriage piece 52. To facilitate this, wings 56 and 58 include x-shaped webs 57 and 59, respectively, and adhesive is applied at 82, as is shown in, FIG. 5 for illustration. Similarly, carriage piece 54 has x-shaped webbings 59 which may be adhered to guide plate 70. Finally, while vacuum is still being applied, carriage pieces 52 and 54 are adhered to each other by adhesive 83 as is shown in FIG. 9. When the adhesive has cured, the shim that is previously been interposed between guide plate 70 and air bearing member 32 is removed. By removing the shim, a small gap 81 is created that is a fraction of the thickness of the shim with this gap 81 providing a region for air cushion 80.

With reference again to the figures, it should thus be appreciated that carriage 36 includes a frame formed by carriage pieces 54 and 56. While in the figures, this frame extends completely around the air bearing member 32 it might be possible to construct an air bearing member and a carriage such that the frame does not extend completely there around. However, it is desirable that the frame extend at least a majority around the air bearing to prevent it from becoming radially removed after the carriage is telescopically received on the air bearing member.

Figure 12:
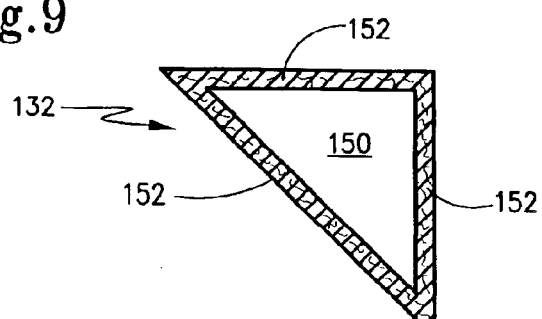
FIG. 12 is a cross-sectional view taken about lines 12—12 of FIG. 11.
Figure 11:
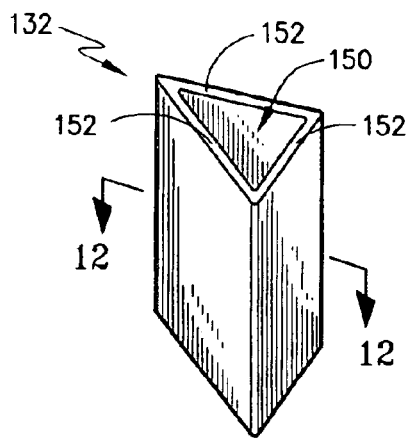
FIG. 11 is a perspective view of an alternative air bearing guide for use in the tape head assembly of FIGS. 2–6.

As noted above, it is possible to construct the air bearing member so as to have a single plenum for air pressure. Thus, as is shown in FIGS. 11 and 12, air bearing member 132 is constructed of the same geometric shape as air bearing 32. Here, however, a single plenum 150 is formed to define an interior 150 for air bearing member 132 such that air bearing member 132 has a surrounding sidewall 152 of substantially uniform thickness. This thickness may, for example, be on the order of 0.040 to 0.100 inches thick where the porous material is alumina.

Figure 13:
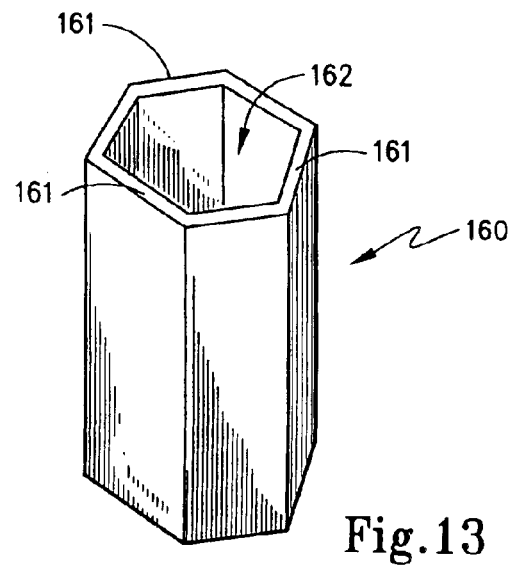
FIG. 13 is a perspective view of another alternative air bearing guide for use in a tape head assembly of the present invention.

Also, as noted above, it is possible to construct the air bearing member to have a different geometry than as the isosceles right triangle discussed above. Accordingly, and to illustrate another possible configuration, FIG. 13 shows an air bearing member 160 formed with a hexagonal cross-section. Here, also, air bearing member 160 has a single plenum 162 defining an interior surrounded by a side wall 161.

While the above-described description illustrates the present invention with a single transducer, it is possible to gang a pair of air bearing members and a pair of carriages together so that two transducers may interact with the tape medium. Accordingly, with reference to FIGS. 14–16, it may be seen that a second embodiment of the present invention includes a pair of air bearing members 232 that are supported in an upright state on a base 234. Bearing members 232 are held in position in a manner similar to that described above utilizing cover plates 246 and mounting screws 248. An upright magnet 242 is also supported in parallel relation to air bearing members 232 as was the case in the first exemplary embodiment.

Figure 15:
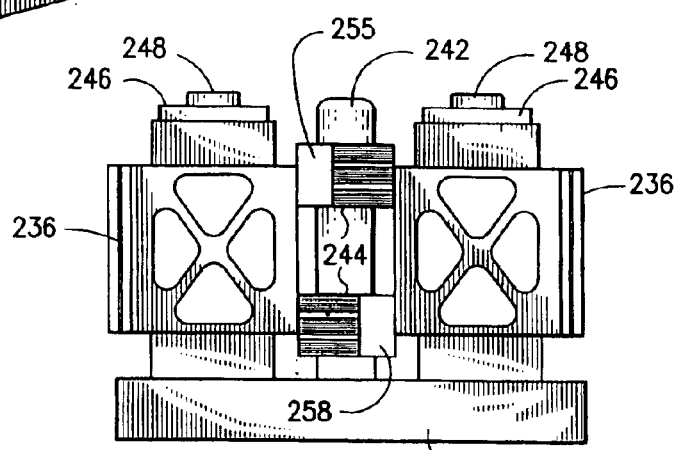
FIG. 15 is a rear view in elevation of the tape head assembly shown in FIG. 14.
Figure 16:
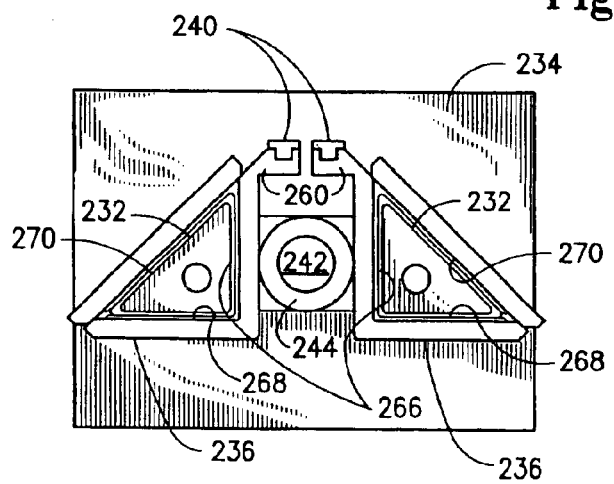
FIG. 16 is top plan view of the tape head assembly shown in FIGS. 14 and 15.
Figure 17:
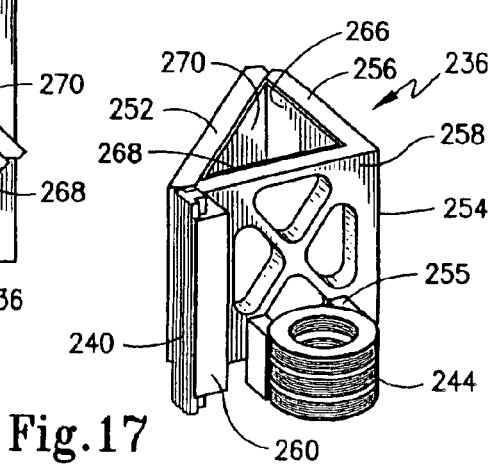
FIG. 17 is a perspective view of the carriage used with the tape head assemblies of FIGS. 2–6, 11–12 and 14–16.

Each air bearing member supports a carriage 236 for reciprocal motion thereon. A representative carriage is shown in FIG. 17 and is constructed substantially similar to carriage 36 but does have some variation therefrom. In the carriage 236, as is shown in FIGS. 14–17 includes a first carriage piece 252 and a second carriage piece 254 with carriage piece 254 being formed by a pair of wings 256 and 258 formed at right angles to one another. Here, however, a mounting bracket 255 is formed on wing 258 of second carriage piece 254 instead of being formed on carriage piece 252. Bracket 255 again supports a coil 244 with coil 244 being located at one end thereof. Likewise, second carriage piece 254 provides a cradle 260 that mounts a transducer 240 thereto.

Figure 14:
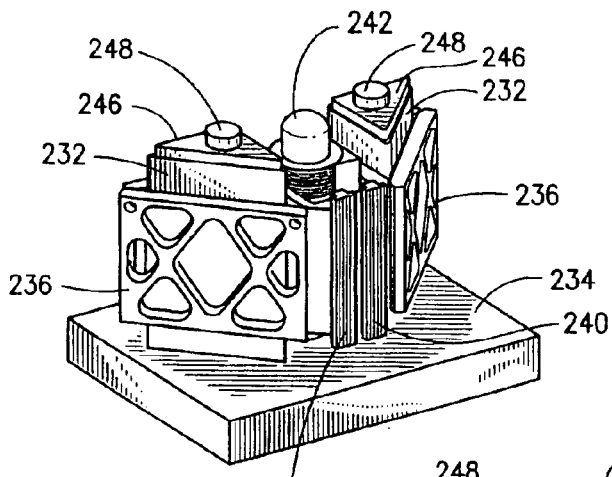
FIG. 14 is a front view in perspective showing an alternative embodiment of the tape head assembly of the present invention incorporating a pair of transducers.

A pair of guide plates 266 and 268 are respectively secured to the wings 256 and 258 of second carriage piece 254, and a guide plate 270 is secured to first carriage piece 252. A carriage piece 236 may now be supported on each air bearing member 232 as is shown in FIGS. 14–16 here it should be appreciated that in order to accommodate two such carriages utilizing a single drive magnet 242, it is necessary that one carriage piece 236 be inverted with respect to the other carriage piece so that the coils 244 are spaced apart from one another as is shown in FIG. 12. Accordingly, each carriage piece 236 may be independently driven on it respective air bearing member 232 by the variable electrical current that is supplied to its respective coil 244. With reference to FIGS. 11 and 13, it should be understood that this mounting places each transducer 240 in closely spaced parallel relation to one another so that they may be placed in proximity to the tape medium. Such arrangement can double the capacity of the read/write operation employing the two transducers.

Based on the foregoing, it should be understood that the present invention includes a transducer head assembly as well as a read/write transport apparatus incorporating the transducer head assembly an improvement thereto. Furthermore, it should be understood that the present invention contemplates a method that is inherent in the above-described structure and operation of such structure. With greater specificity, the method according to the present invention includes the step of providing an air bearing member having a bearing surface area. The method then includes supporting a transducer on the air bearing member in a manner such that it can reciprocate with respect to the bearing surface area. Air (or other gas) is ejected from the bearing surface area so that the transducer is floatably supported on a resulting air cushion. Finally, the method includes the step of controlling the reciprocation of the transducer.

This method can include any additional steps that are inherent in the transducer head assembly described in this application. For example and not limitation, the method could include the step of supporting the transducer on a carriage that floats on the air cushion. The method could include the step of keying the transducer or the carriage such that it resists rotational motion while reciprocating relative to the bearing surface. The method can include the step of providing a porous ceramic air bearing member. The step of controlling reciprocation can be accomplished electromagnetically. Other processing steps, of course, are also inherent in the structure.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

We claim:

1. A transducer head assembly adapted for use in a read/write application, comprising:
   (A) an air bearing member adapted to be placed in fluid communication with a source of pressurized air when in an active state and having a bearing surface area from which air is emitted when in the active state;
   (B) a carriage supported on said air bearing member such that, when said air bearing member is in the active state, an air cushion is created between the bearing surface and said carriage whereby said carriage floats for reciprocal movement along a translational axis relative to said air bearing member;
   (C) a transducer disposed on said carriage; and
   (D) a drive operative to reciprocate said carriage.

2. A transducer head assembly according to claim 1 wherein a portion of said air bearing member providing the bearing surface is constructed of a porous material.

3. A transducer head assembly according to claim 2 wherein said porous material is selected from a group consisting of ceramics, metals and composite materials.

4. A transducer head assembly according to claim 2 wherein said porous material is a ceramic material impregnated with a selected adhesive.

5. A transducer head assembly according to claim 2 wherein said porous material is alumina.

6. A transducer head assembly according to claim 2 wherein said porous material is between two and fifty percent open.

7. A transducer head assembly according to claim 1 wherein said air bearing member is constructed entirely of a porous ceramic material.

8. A transducer head assembly according to claim 7 wherein said air bearing member has at least one air distribution cavity formed therein.

9. A transducer head assembly according to claim 8 wherein said air bearing member is formed as a shell having a side wall surrounding a longitudinally extending plenum.

10. A transducer head assembly according to claim 9 wherein said sidewall has a thickness of about 0.040 to 0.100 inches.

11. A transducer head assembly according to claim 8 wherein said air bearing member has a plurality of air distribution cavities formed as a plurality of generally parallel elongated bores.

12. A transducer head assembly according to claim 11 including a manifold adapted to be placed in fluid communication with the source of pressurized air, said manifold being in fluid communication with the bores.

13. A transducer head assembly according to claim 12 wherein said manifold is formed in said air bearing member.

14. A transducer head assembly according to claim 13 wherein said manifold includes a channel formed in said air bearing member, said channel intersecting the bores.

15. A transducer head assembly according to claim 1 wherein said carriage and said air bearing member are keyed with respect to one another thereby to prevent relative rotation about the translational axis.

16. A transducer head assembly according to claim 1 wherein said carriage includes a glide portion facing the bearing surface such that, when in the active state, said glide portion is supported by the air cushion.

17. A transducer head assembly according to claim 16 wherein said carriage includes a frame and at least one glide plate secured to said frame to form said glide portion.

18. A transducer head assembly according to claim 1 wherein said air bearing member is formed generally in the shape of a prism having a cross section in the shape of a polygon with n sides wherein n is an integer greater than 2.

19. A transducer head assembly according to claim 18 wherein said carriage includes a frame extending a majority around said air bearing.

20. A transducer head assembly according to claim 19 wherein said frame extends completely around said air bearing.

21. A transducer head assembly according to claim 1 wherein said drive includes a magnet and an electromagnetic coil.

22. A transducer head assembly according to claim 1 including at least two air bearing members adapted to be placed in fluid communication with the source of pressurized air when in an active state and each having a bearing surface area from which air is emitted when in the active state and a carriage supported for reciprocal movement on each of the two air bearing members such that, when each said air bearing member is in the active state, an air cushion is created between the bearing surface thereof and a respective said carriage whereby each said carriage floats for reciprocal movement relative to a respective said air bearing member, and including a transducers disposed on each said carriage member.

23. A tape head assembly adapted for use in a tape drive apparatus, comprising:

(A) an elongated air bearing member constructed of a porous ceramic material having a central longitudinal axis and a cross-section of selected geometric size and shape, said air bearing member adapted to be placed in fluid communication with a source of pressurized gas when in an active state, said air bearing member and having a bearing surface area from which gas is emitted when in the active state;

(B) a carriage telescopically receiving said air bearing member for reciprocal movement along said air bearing member, said carriage including a glide portion facing the bearing surface such that, when in the active state, an air cushion is created between the bearing surface and said glide portion whereby said carriage floats relative to said air bearing member;

(C) a transducer disposed on said carriage; and (D) a drive operative to reciprocate said carriage.

24. A tape head assembly according to claim 23 wherein the selected geometric shape is a polygon having n sides where n is an integer greater than 2.

25. A tape head assembly according to claim 24 wherein the polygon is a triangle.

26. A tape head assembly according to claim 25 wherein the triangle is a 45 degree isosceles right triangle.

27. A tape head assembly according to claim 24 wherein said carriage includes a frame surrounding at least a majority of said air bearing member and at least one glide plate secured to said frame to form glide portion.

28. A tape head assembly according to claim 27 wherein said frame includes n frame pieces, there being a respective said frame piece associated with each said side, and including a glide plate secured to each said frame piece.

29. A tape head assembly according to claim 28 wherein said frame pieces are affixed to one another at vertices of the polygon.

30. A tape head assembly according to claim 29 wherein said glide plates are adhered to said frame pieces.

31. A tape head assembly according to claim 23 wherein said drive includes an electromagnetic coil secured to said carriage.

32. A tape head assembly according to claim 23 wherein said air bearing member is formed as a shell having a side wall surrounding a longitudinally extending plenum.

33. A tape head assembly according to claim 32 wherein said sidewall has a thickness of about 0.040 to 0.100 inches.

34. A tape head assembly according to claim 23 wherein said air bearing member has a plurality of air distribution cavities formed as a plurality of generally parallel elongated bores.

35. A tape head assembly according to claim 23 wherein said carriage includes a frame and at least one glide plate secured to said frame to form said glide portion.

36. In a tape read/write apparatus adapted to receive a tape medium and to transport said tape medium in a transport direction in order to read/write data thereon including docking station operative to receive a source of tape medium to be processed, a tape take-up assembly to receive a quantity of the tape medium from the tape source, at least a first tape transport bearing on one side of a transducer region relative to the transport direction and a second tape transport bearing on an opposite side of the transducer region to the transport direction, a tape drive operative to advance said tape in the transport direction across said transport bearings between said tape source and said tape take-up assembly, the improvement comprising a read/write recording assembly including an air bearing member adapted to be placed in fluid communication with a source of pressurized air when in an active state and having a bearing surface area from which air is emitted when in the active state, a carriage supported on said air bearing member such that, when said air bearing member is in the active state, an air cushion is created between the bearing surface and said carriage whereby said carriage floats for reciprocal movement along a translational axis relative to said air bearing member, a transducer disposed on said carriage and operative to read/write data on said tape medium, and a drive operative to reciprocate said carriage.

37. The improvement according to claim 36 wherein said air bearing is oriented transversely of the transport direction.

38. The improvement according to claim 36 wherein a portion of said air bearing member providing the bearing surface is constructed of a porous material.

39. The improvement according to claim 38 wherein said porous material is a ceramic material.

40. The improvement according to claim 39 wherein said porous material is alumina.

41. The improvement according to claim 38 wherein said air bearing member is constructed entirely of a porous ceramic material.

42. The improvement according to claim 36 wherein said air bearing member has at least one air distribution cavity formed therein.

43. The improvement according to claim 36 wherein said air bearing member has a plurality of air distribution cavities formed as a plurality of generally parallel elongated bores.

* * * * *